US007290820B1

(12) United States Patent
Smith et al.

(10) Patent No.: US 7,290,820 B1
(45) Date of Patent: Nov. 6, 2007

(54) VEHICLE CARGO RETENTION SYSTEM

(75) Inventors: James B. Smith, Saint Clair Shores, MI (US); Edward Szymczak, Macomb, MI (US); Regina D. Dix, Highland Park, MI (US); Robert T. Gazda, Marysville, MI (US); Jacqueline A. Reckling, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/415,905

(22) Filed: May 2, 2006

(51) Int. Cl.
B62D 33/02 (2006.01)
(52) U.S. Cl. ..................... 296/39.2; 296/37.6
(58) Field of Classification Search ............. 296/183.1, 296/37.6, 37.5, 39.1, 39.2
See application file for complete search history.

(56) References Cited

U.S. PATENT DOCUMENTS

| | | | | |
|---|---|---|---|---|
| 4,875,730 A | * | 10/1989 | Justice | 296/37.5 |
| 5,456,514 A | * | 10/1995 | Justice | 296/39.2 |
| 6,505,872 B2 | * | 1/2003 | Hong | 296/26.11 |
| 6,550,836 B2 | * | 4/2003 | Rigau | 296/37.6 |
| 6,648,398 B2 | * | 11/2003 | Duffy | 296/146.11 |
| 6,827,385 B2 | * | 12/2004 | Mobley | 296/39.2 |
| 6,986,541 B1 | * | 1/2006 | Haack | 296/39.2 |
| 7,017,977 B1 | * | 3/2006 | Kelter | 296/182.1 |
| 7,086,688 B2 | * | 8/2006 | Edwards | 296/181.3 |
| 7,097,224 B2 | * | 8/2006 | Lester et al. | 296/37.14 |
| 7,118,151 B2 | * | 10/2006 | Bejin et al. | 296/37.1 |
| 2003/0090120 A1 | * | 5/2003 | Barber et al. | 296/37.5 |
| 2005/0052053 A1 | * | 3/2005 | Rhodes et al. | 296/183.1 |
| 2006/0071498 A1 | * | 4/2006 | Taylor | 296/26.09 |

OTHER PUBLICATIONS

McCormick, John, "Honda Uncovers Its First Truck," Detroit News Autos Insider, Jan. 10, 2005.

* cited by examiner

Primary Examiner—Jason S Morrow

(57) ABSTRACT

A pickup truck cargo box includes a cargo floor and a panel being movably mounted with respect to the cargo floor. The panel is movable between a stowed position and an upright position, in which the panel extends higher into a cargo area to form a compartment within the cargo area. The panel prevents the shifting of cargo during transport when upright, and is stowable to maximize the uninterrupted cargo area available.

13 Claims, 3 Drawing Sheets

VEHICLE CARGO RETENTION SYSTEM

TECHNICAL FIELD

This invention relates to vehicle cargo areas having a panel movable between a stowed position and an upright position to divide the cargo area and thereby prevent cargo shifting.

BACKGROUND OF THE INVENTION

Prior art pickup trucks include a cab for carrying a driver and one or more passengers, as well as a cargo box behind the cab for carrying cargo. The cargo box is typically defined by a cargo floor, two sidewalls, and the back of the cab. The cargo box includes an opening at the rearward end to facilitate the loading and unloading of cargo onto the cargo floor. A tailgate is pivotably mounted to the end of the cargo box to selectively close the rearward opening thereof. Cargo placed on the cargo floor adjacent the opening may shift forward during movement of the pickup truck, away from the opening.

Cargo boxes are typically open and exposed from the exterior. In order to secure personal items in the cargo box, a separate, lockable tool box is sometimes placed in the front portion of the cargo box. However, the tool box reduces the length of the cargo box available for cargo.

SUMMARY OF THE INVENTION

A pickup truck with a cargo box is provided. The cargo box includes a cargo floor and two sidewalls that cooperate to at least partially define a cargo area. The cargo box also includes at least one panel that is movably mounted with respect to the floor and selectively movable between a stowed position and an upright position. In the upright position, the panel extends higher into the cargo area thereby to separate a first portion of the cargo area and a second portion of the cargo area.

The panel, when upright, prevents the shifting of cargo during vehicle movement by creating a barrier to restrict cargo to one portion of the cargo area. Thus, if the panel is in close proximity to a rear opening of the cargo box, the panel prevents the shifting of cargo forward of the panel, thus keeping the cargo close to the opening for easy removal after transport.

In an exemplary embodiment, the panel defines a storage compartment with a closable door. The storage compartment provides secure storage for personal or other items, and, when the panel is in the stowed position, does not substantially affect the length of the cargo box available for other cargo.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
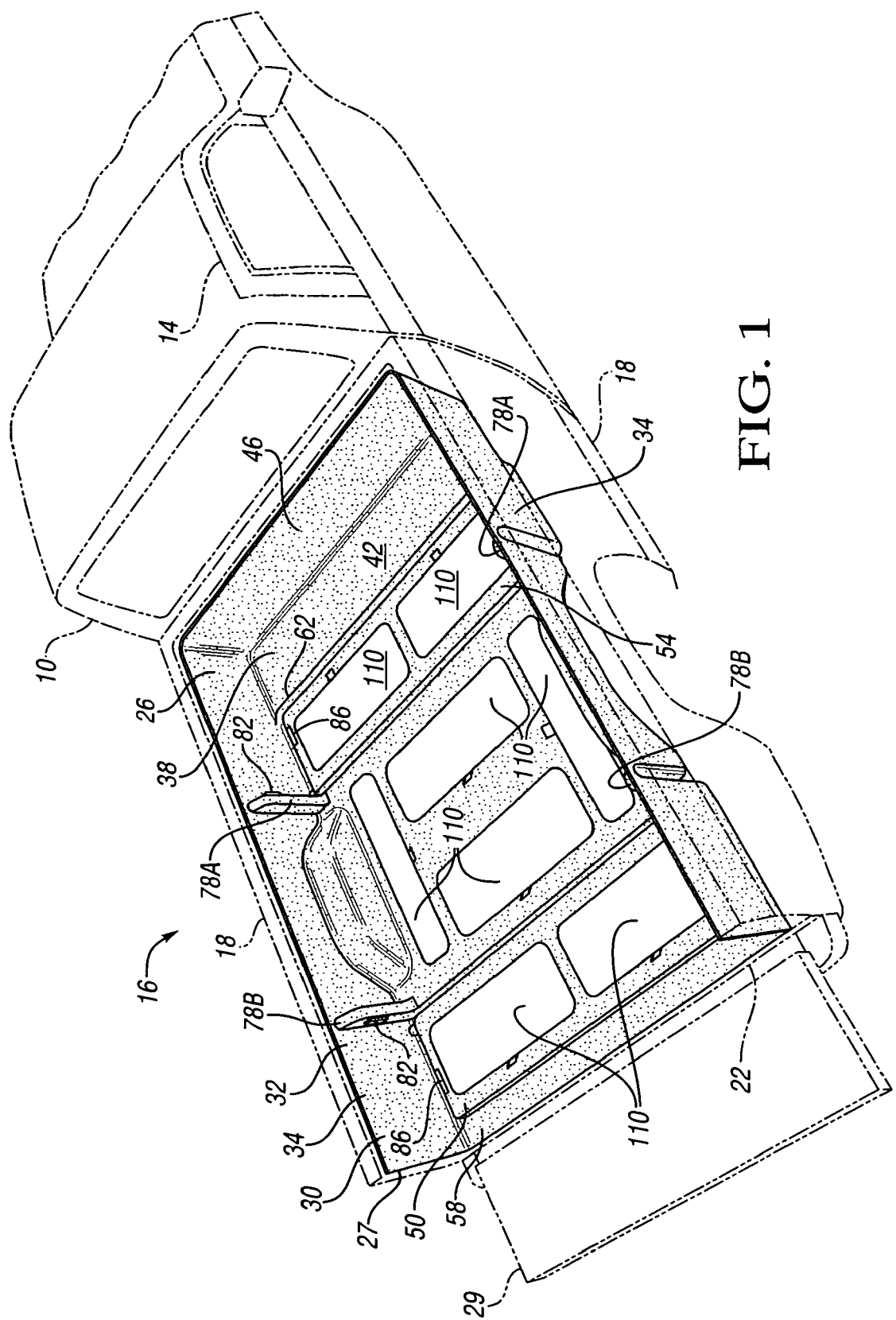
FIG. 1 is a schematic, perspective view of a pickup truck including a cargo box bed liner having two selectively movable panels in respective stowed positions.

Referring to FIG. 1, a pickup truck 10 is schematically depicted. The pickup truck 10 includes a cab 14 for enclosing a driver and one or more passengers. The pickup truck also includes a cargo box 16 that has two sidewalls 18 and a load floor 22 that cooperate with the rear panel of the cab 14 to define a cargo area 26. The floor 22 and the sidewalls 18 cooperate to define an opening 27 at the rearward end of the cargo box 16 to facilitate the loading and unloading of cargo. A tailgate 29 is pivotable between an open position, as shown, and a closed position in which the tailgate 29 obstructs the opening 27.

In the embodiment depicted, the pickup truck 10 includes a bed liner 30 inside the cargo area 26. The bed liner 30 includes a member 32 that defines two sidewalls 34 and a floor 38 that cooperate to define cargo area 42 that is coextensive with cargo area 26. As used in the claims, a "sidewall" or a "floor" of a cargo box may be part of the vehicle body, as sidewalls 18 and floor 22, or they may be part of a bed liner, as sidewalls 34 and floor 38. Member 32 also defines front wall 46 that defines the forward extent of cargo area 42.

The member 32 may be of single-piece construction or multiple-piece construction within the scope of the claimed invention. Bed liner 30 is preferably configured not to interfere with the installation of after-market products such as caps, tonneau covers, etc. For example, sidewalls 34 are positioned under the upper rails of sidewalls 18 so that the bed liner is under or flush to the top of the cargo box 16. Those skilled in the art will recognize a variety of materials that may be employed to form the member 32 within the scope of the claimed invention, such as polyethylene, fiber glass, etc.

A first panel 50 is pivotably connected at one end to the floor 38 via hinges (not shown). A second panel 54 is pivotably connected at one end to the floor 38 via hinges (not shown). The first panel 50 and the second panel 54 are shown in respective stowed positions in FIG. 1.

When in their respective stowed positions, the panels 50, 54 are arranged such that their smallest dimension (i.e., thickness) is vertically oriented to maximize vertical cargo space in the cargo area 42. To further maximize the vertical cargo space in the cargo area 42, the panels 50, 54 rest on the floor 38 and are at least partially located in a respective concavity 58, 62 formed in the floor 38 when in their respective stowed positions.

Figure 2:
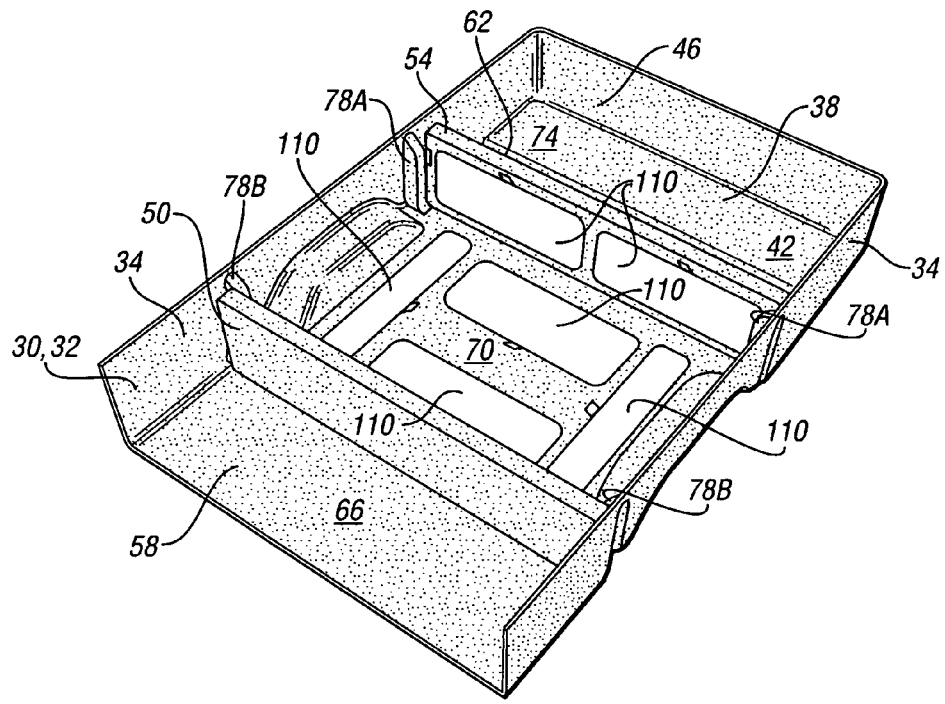
FIG. 2 is a schematic, perspective view of the bed liner of FIG. 1 with the two selectively movable panels in respective upright positions.

Each panel 50, 54 is selectively pivotable approximately 90 degrees to a respective upright position, as shown in FIG. 2. Referring to FIG. 2, wherein like reference numbers refer to like components from FIG. 1, panel 50 is oriented such that its smallest dimension is not vertically oriented, and, accordingly, the panel 50 extends higher into the cargo area 42 than when in the stowed position as shown in FIG. 1. Similarly, panel 54 is oriented such that its smallest dimension is not vertically oriented, and, accordingly, the panel 54 extends higher into the cargo area 42 than when in the stowed position as shown in FIG. 1. It may be desirable for the panels 50, 54 to be made of a light-weight material, such as light-weight plastic, to facilitate the movement of the panels between the stowed and upright positions.

In the upright position, the panel 50 separates a first portion 66 of the cargo area 42 and a second portion 70 of the cargo area. Similarly, in the upright position, the panel 54 separates the second portion 70 of the cargo area 42 from a third portion 74 of the cargo area 42. Each portion 66, 70, 74 forms a compartment. The panels 50, 54 prevent load shifting by retaining cargo in a respective one of the compartments. Thus, for example, cargo placed in the first portion 66 of the cargo area will remain in the first portion 66 of the cargo area adjacent the opening 27 because of the first panel 50.

Referring again to FIG. 1, each sidewall 34 defines a respective forward protrusion 78A and a respective rearward protrusion 78B. Protrusions 78A and 78B extend inward into the cargo area 42, and are sufficiently positioned to cause physical part interference with a respective one of the panels 50, 54 in their upright positions. More specifically, and with reference to FIG. 2, the rearward protrusions 78B physically interfere with forward rotation of the first panel 50 in the upright position. Similarly, the forward protrusions 78A physically interfere with the rearward rotation of the second panel 54 in the upright position.

Figure 3:
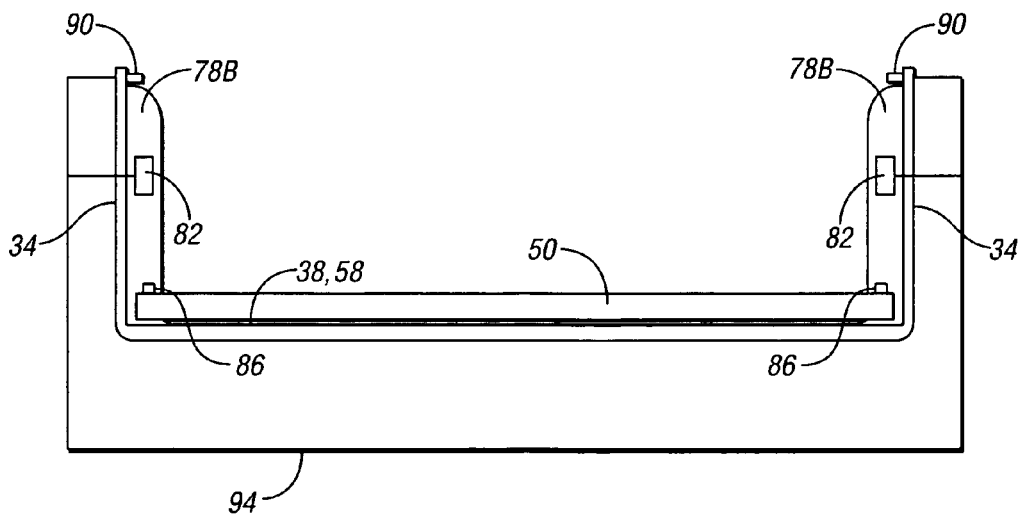
FIG. 3 is a schematic, rear view of the bed liner of FIGS. 1 and 2.

Referring to FIG. 3, wherein like reference numbers refer to like components from FIGS. 1 and 2, each rearward protrusion 78B has a latch member 82 thereon. The panel 50, which is shown in its stowed position in FIG. 3, has two latch members 86 mounted thereon for movement therewith. Latch members 86 are releasably engageable with latch members 82. Each of latch members 86 is positioned on the panel 50 so as to align with, and engage, a respective one of the latch members 82 on a respective one of the rearward protrusions 78B when the panel 50 is in the upright position.

Latch members 82, 86 cooperate to form a latching system configured to releasably lock the panel 50 in the upright position. For example, latch members 82 may be latches such as those used with vehicle doors or tailgates, and latch members 86 may be strikers. Exemplary latches and strikers are described in U.S. Pat. Nos. 5,618,069, issued Apr. 8, 1997 to Konchan, et al., and 6,364,379, issued Apr. 2, 2002 to Roberts, et al., both of which are hereby incorporated by reference in their entireties. In the context of the claimed invention, a "latch system" may include any device or devices sufficiently configured to releasably retain a panel in its upright position.

When latch members 82 and latch members 86 are engaged with one another, they lock together, thereby locking the panel 50 with respect to the sidewalls 34 in the upright position. The latch members 82, 86 are releasably engageable. A first latch release device 90 is mounted with respect to one of the sidewalls 34, and a second latch release device 90 is mounted with respect to the other sidewall 34. Exemplary latch release devices include push-buttons, pull handles, etc. Each latch release device 90 is operatively connected to both latches 82 on the rear protrusions 78B, and each latch release device 90 is operative to selectively cause the disengagement of both of the latches 82 to release the panel 50 from its upright position. Thus, a vehicle user can disengage both latches 82 using a single latch release device 90 when moving the panel 50 from the upright position to the stowed position.

A connection system 94 operatively interconnects each release device 90 with both latches 82. In an exemplary embodiment, the connection system 94 is mechanical, and employs cables or rods. In another exemplary embodiment, the connection system is electrical, and includes actuators (not shown) to cause the disengagement of the latches 82. For clarity, the latch release devices are shown only in FIG. 3. It should be noted that the latch system shown in FIG. 3 with respect to the first panel 50 and the rear protrusions 78B is substantially similar to the latch system employed with the panel 54 and the forward protrusions 78A.

Figure 4:
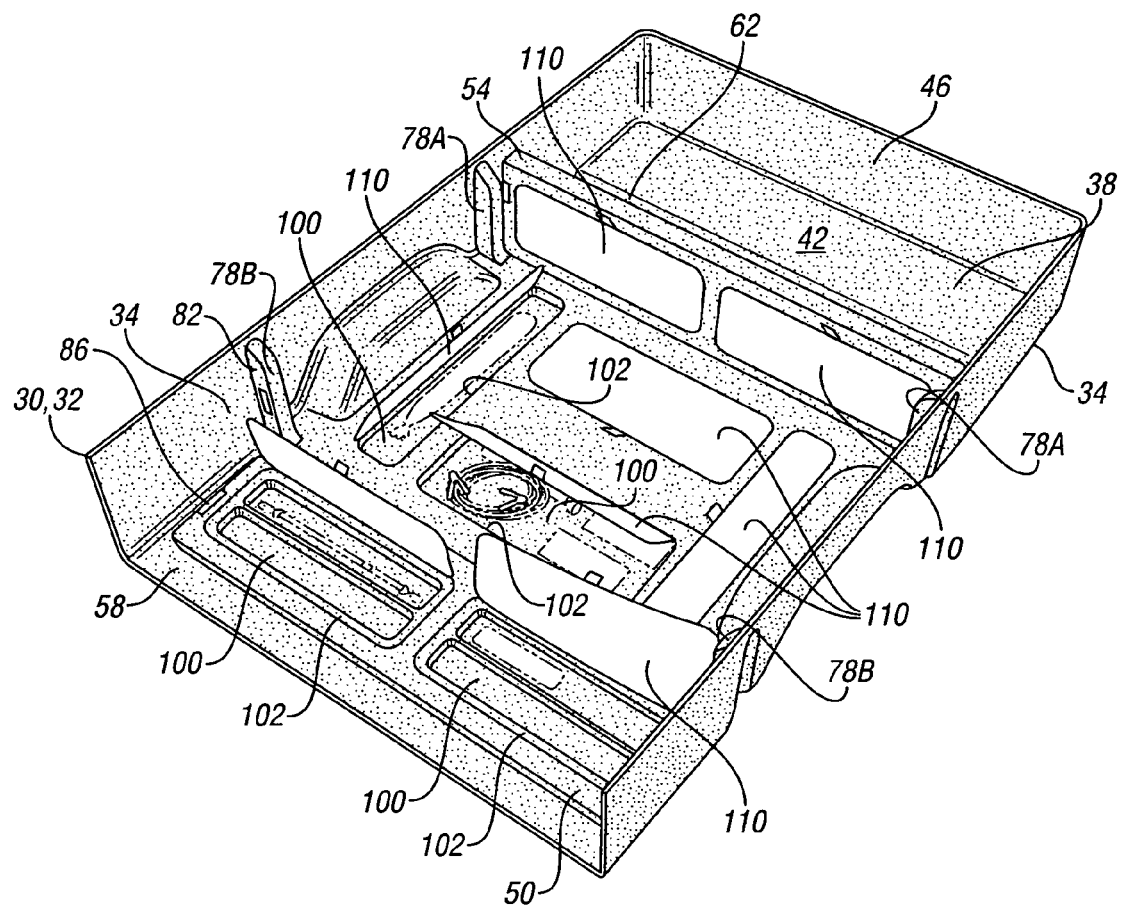
FIG. 4 is a schematic, perspective view of the bed liner of FIGS. 1-3 with one of the movable panels in its respective stowed position and the other of the movable panels in its respective upright position.

Referring to FIG. 4, wherein like reference numbers refer to like components from FIGS. 1-3, each panel 50, 54 defines storage compartments 100 therein. The floor 38 also defines a plurality of storage compartments 100 between the panels 50, 54. Each storage compartment 100 has a respective opening 102. Each storage compartment 100 has a respective door 110 that is pivotably connected with respect to a panel 50, 54 or the floor 38 and that is movable between an open position and a closed position. In the closed position, each door 110 closes a respective opening 102 to secure a respective storage compartment 100. All doors 110 are shown in respective closed positions in FIGS. 1 and 2. The doors 110 that are pivotably connected to the panel 50 are depicted in their respective open positions in FIG. 4, as are two of the doors 110 pivotably connected to the floor 38.

While the best mode for carrying out the invention have been described in detail, those familiar with the art to which this invention relates will recognize various alternative designs and embodiments for practicing the invention within the scope of the appended claims.

The invention claimed is:

1. A pickup truck comprising:
   a cargo floor and two sidewalls that cooperate to at least partially define a cargo area;
   a first panel being movably mounted with respect to the floor and selectively movable between a stowed position and an upright position in which the first panel extends higher than in the stowed position thereby to separate a first portion of the cargo area and a second portion of the cargo area;
   a latch system configured to selectively lock the first panel in the upright position; and
   at least one storage compartment housed within the first panel and having an opening.

2. The pickup truck of claim 1, further comprising a door being movably mounted to the first panel to selectively obstruct the opening of the storage compartment within the first panel.

3. The pickup truck of claim 1, further comprising a second panel being movably mounted with respect to the floor and selectively movable between a stowed position and an upright position in which the second panel extends higher than in the stowed position thereby to separate the second portion of the cargo area and a third portion of the cargo area.

4. The pickup truck of claim 1, wherein said latch system includes a first latch member being mounted with respect to one of the sidewalls; and a second latch member being mounted with respect to the first panel for movement therewith; said first latch member being releasably engageable with the second latch member to retain the first panel in the upright position.

5. The pickup truck of claim 1, wherein said latch system includes a first latch member being mounted with respect to a first of said sidewalls;
   a second latch member being mounted with respect to the first panel for movement therewith;
   a third latch member being mounted with respect to a second of said sidewalls;
   a fourth latch member being mounted with respect to the first panel for movement therewith;

a first latch release mounted with respect to the first of said sidewalls; and a second latch release mounted with respect to the second of said sidewalls;

said first latch member being releasably engageable with the second latch member and said third latch member being releasably engageable with the fourth latch member to retain the first panel in the upright position; and wherein said first latch release and said second latch release are both operatively connected to the first and third latch members and operative to selectively release the first latch member from the second latch member and the third latch member from the fourth latch member.

6. A bed liner for a pickup truck having two sidewalls and a cargo floor cooperating to at least partially define a cargo box, the bed liner comprising:

a member defining a floor that is configured to cover at least part of the cargo floor and that at least partially defines a cargo area;

a panel being movably mounted with respect to the floor and selectively movable between a stowed position and an upright position in which the panel extends higher than in the stowed position thereby to separate a first portion of the cargo area and a second portion of the cargo area; and at least one storage compartment housed within the panel and having an opening.

7. The bed liner of claim 6, wherein the floor is characterized by a concavity; and wherein the panel is at least partially within the concavity when in the stowed position.

8. The bed liner of claim 6, wherein the member defines a first sidewall and a second sidewall that cooperate with the floor to define the cargo area; wherein the first sidewall is characterized by a protrusion that is sufficiently positioned to restrict movement of the panel in the upright position.

9. The bed liner of claim 6, further comprising a door being movably mounted to the panel to selectively obstruct the opening of the storage compartment within the panel.

10. The bed liner of claim 6, wherein the member defines at least one floor storage compartment having an opening formed in the floor; and wherein the bed liner further comprises a door being movably mounted with respect to the member to selectively obstruct the opening of the floor storage compartment.

11. The bed liner of claim 6, further comprising a first latch member mounted with respect to the member and a second latch member mounted with respect to the panel for movement therewith; wherein said first latch member is releasably engageable with said second latch member to retain the panel in the upright position.

12. The bed liner of claim 6, wherein the member defines a first sidewall and a second sidewall; and wherein the bed liner further comprises a first latch member being mounted with respect to a first of said sidewalls;

a second latch member being mounted with respect to the panel for movement therewith;

a third latch member being mounted with respect to a second of said sidewalls;

a fourth latch member being mounted with respect to the panel for movement therewith;

a first latch release mounted with respect to the first of said sidewalls; and a second latch release mounted with respect to the second of said sidewalls;

said first latch member being releasably engageable with the second latch member and said third latch member being releasably engageable with the fourth latch member to retain the panel in the upright position; and wherein said first latch release and said second latch release are both operatively connected to the first and third latch members and operative to selectively release the first latch member from the second latch member and the third latch member from the fourth latch member.

13. A bed liner for a pickup truck having two sidewalls and a cargo floor cooperating to at least partially define a cargo box, the bed liner comprising:

a member defining a bed liner floor that is configured to cover at least part of the cargo floor and that at least partially defines a cargo area;

a first panel and a second panel being movably mounted with respect to the bed liner floor and selectively pivotable about a horizontal axis between respective stowed positions and respective upright positions; wherein the first and second panels extend higher in the upright positions than in the stowed positions thereby to separate a first portion of the cargo area, a second portion of the cargo area, and a third portion of the cargo area; and wherein the member defines at least one floor storage compartment having an opening formed in the floor; and wherein the bed liner further comprises a door being movably mounted with respect to the member to selectively obstruct the opening of the floor storage compartment.

\* \* \* \* \*